(No Model.) 8 Sheets—Sheet 1.

W. H. MADDOCK.
PLATE ROLLING MILL.

No. 530,112. Patented Dec. 4, 1894.

WITNESSES

INVENTOR
William H. Maddock
by W. Bakewell & Sons
his Attorneys (No Model.) 8 Sheets—Sheet 2.
W. H. MADDOCK.
PLATE ROLLING MILL.
No. 530,112. Patented Dec. 4, 1894.
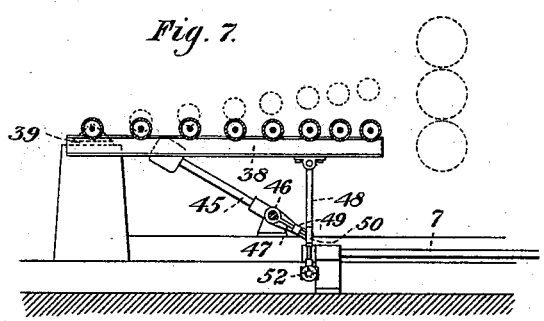
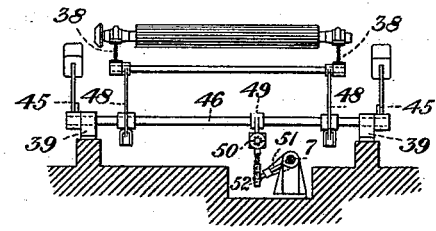
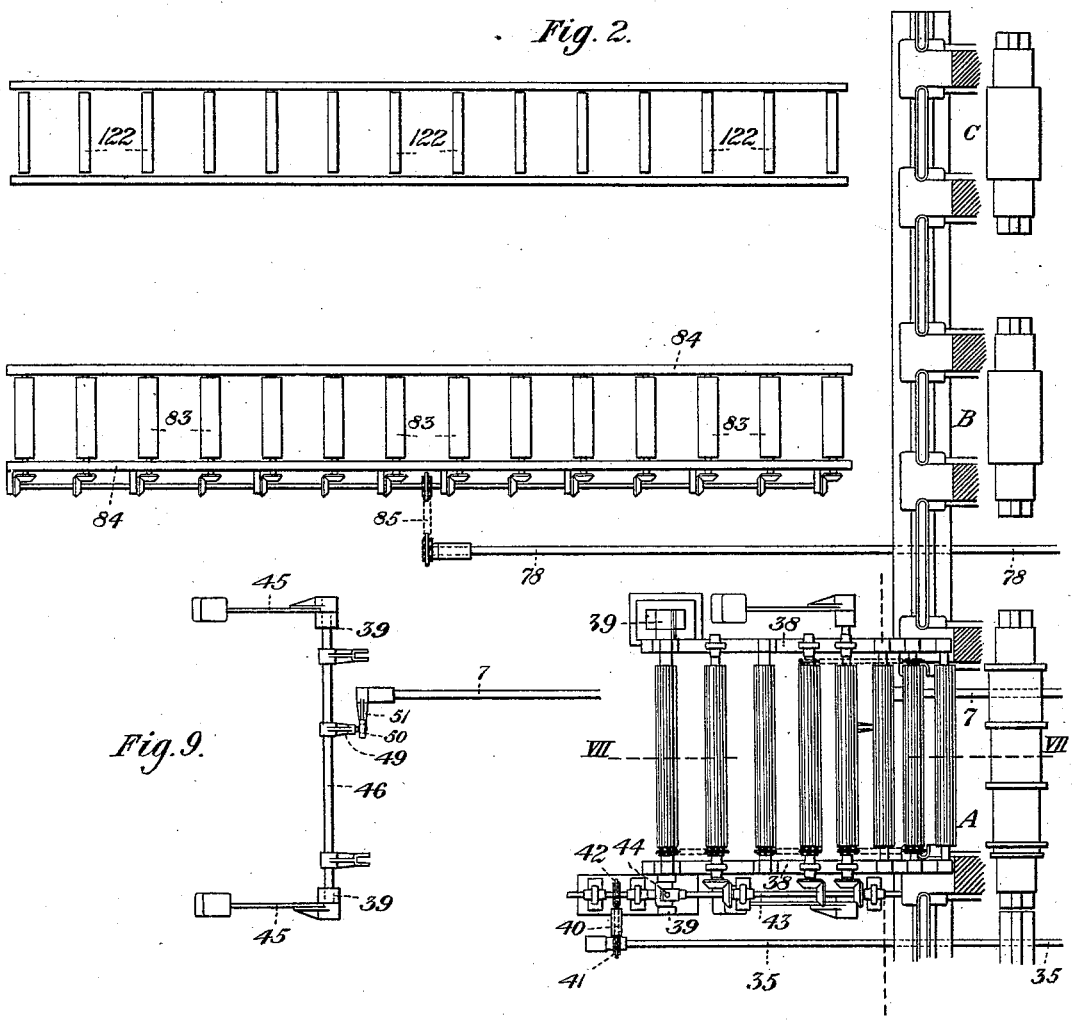
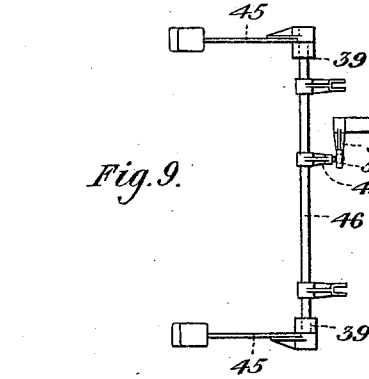
WITNESSES
INVENTOR
William H. Maddock
by W. Bakewell & Sons
his Attorneys

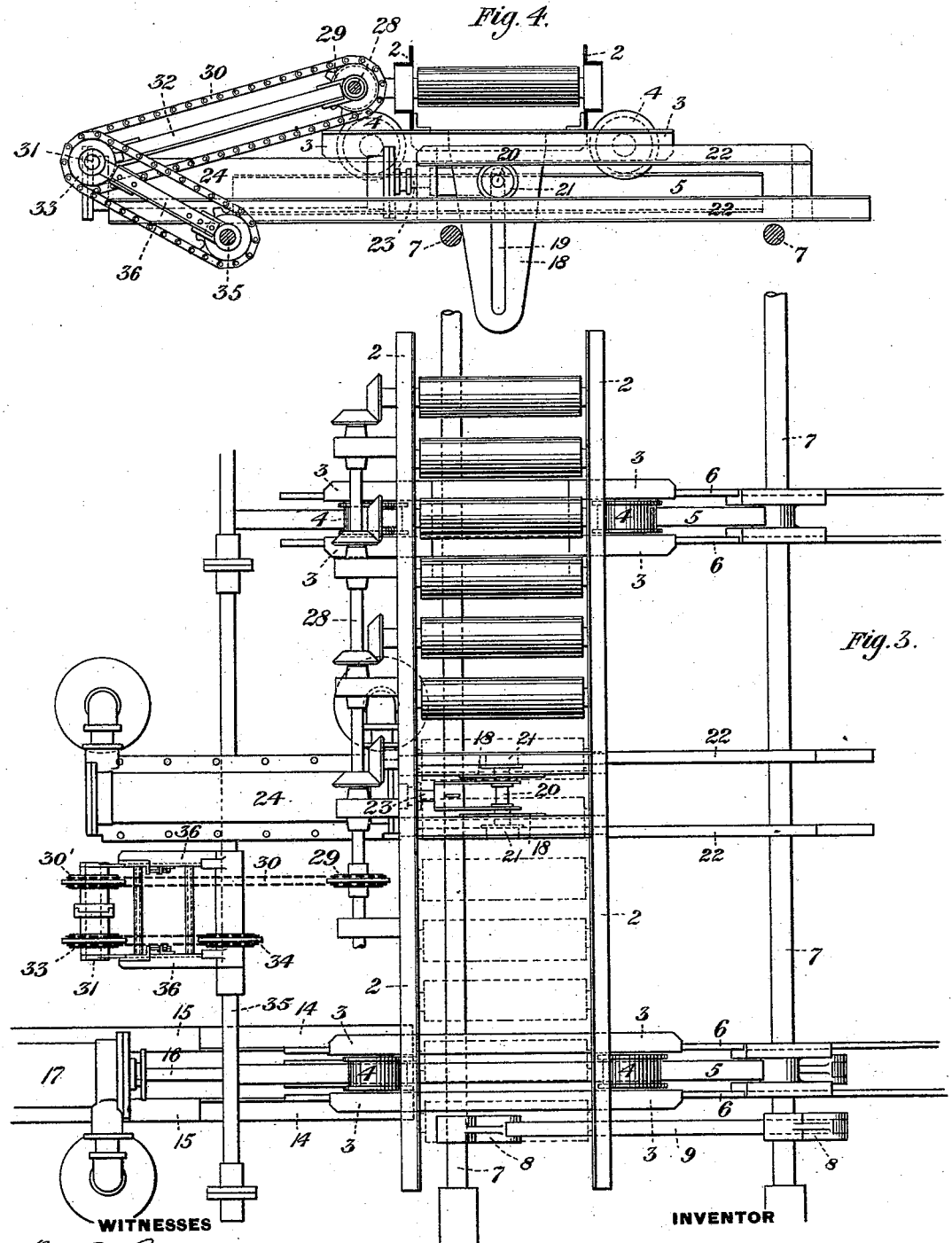

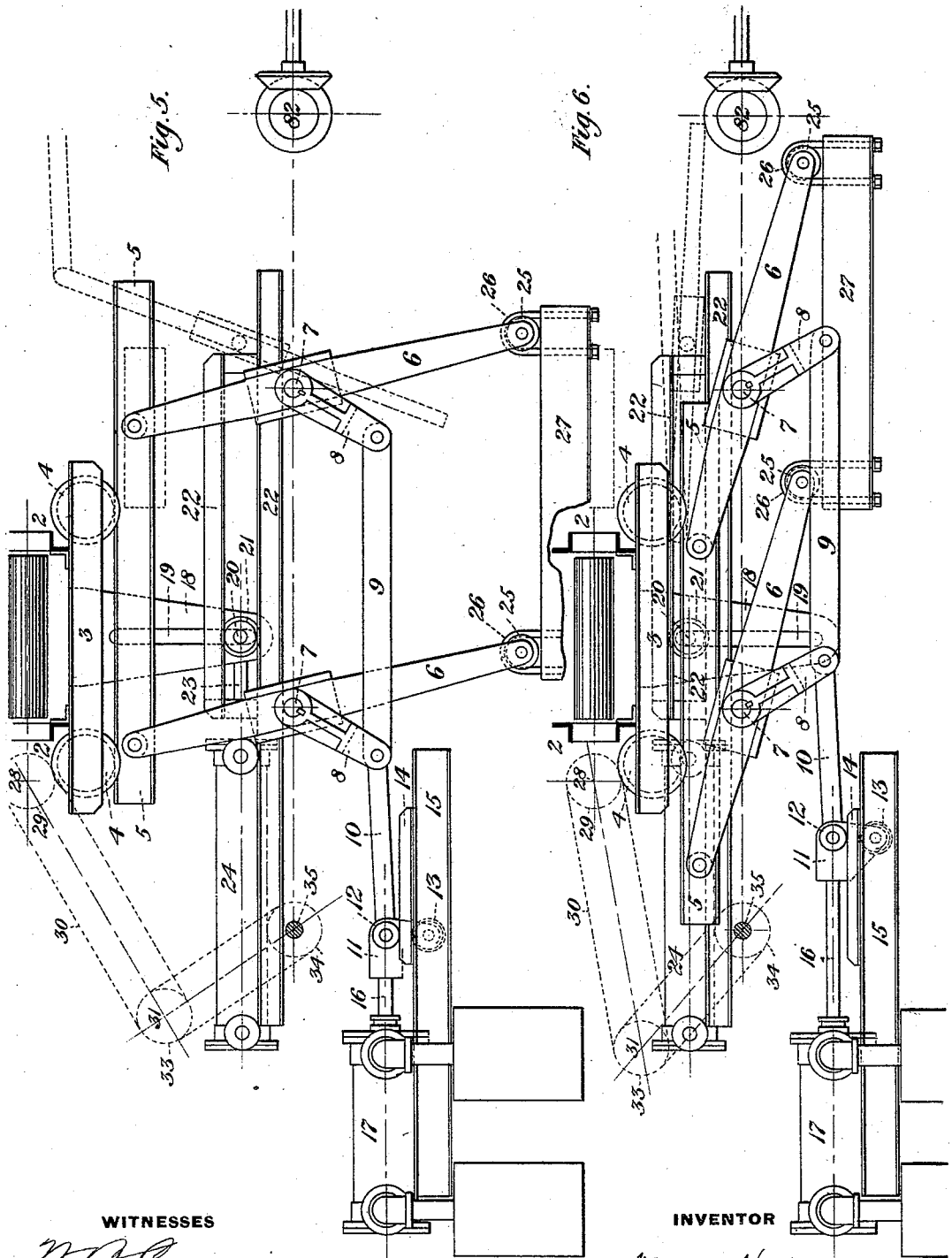

(No Model.) 8 Sheets—Sheet 5.
W. H. MADDOCK.
PLATE ROLLING MILL.
No. 530,112. Patented Dec. 4, 1894.
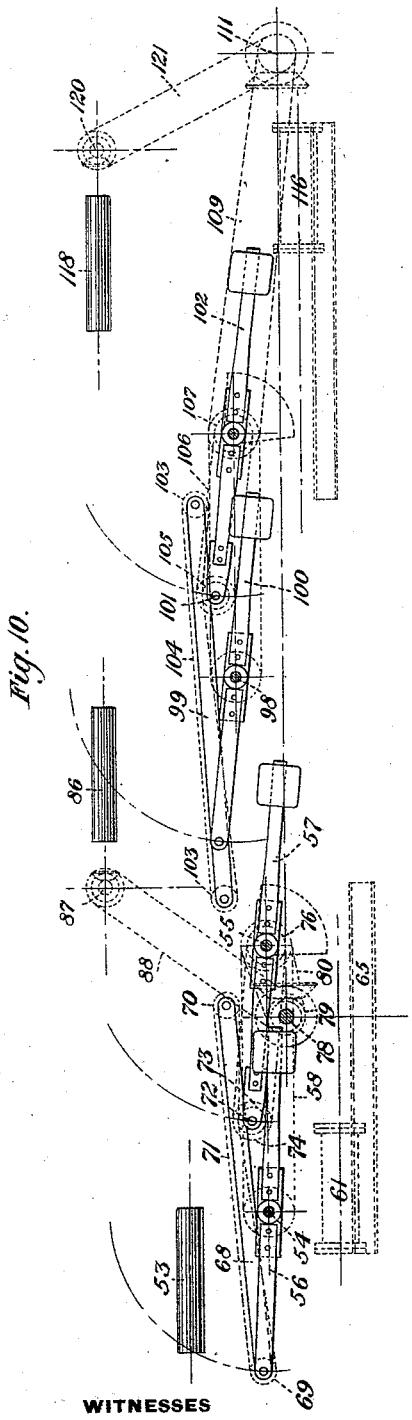
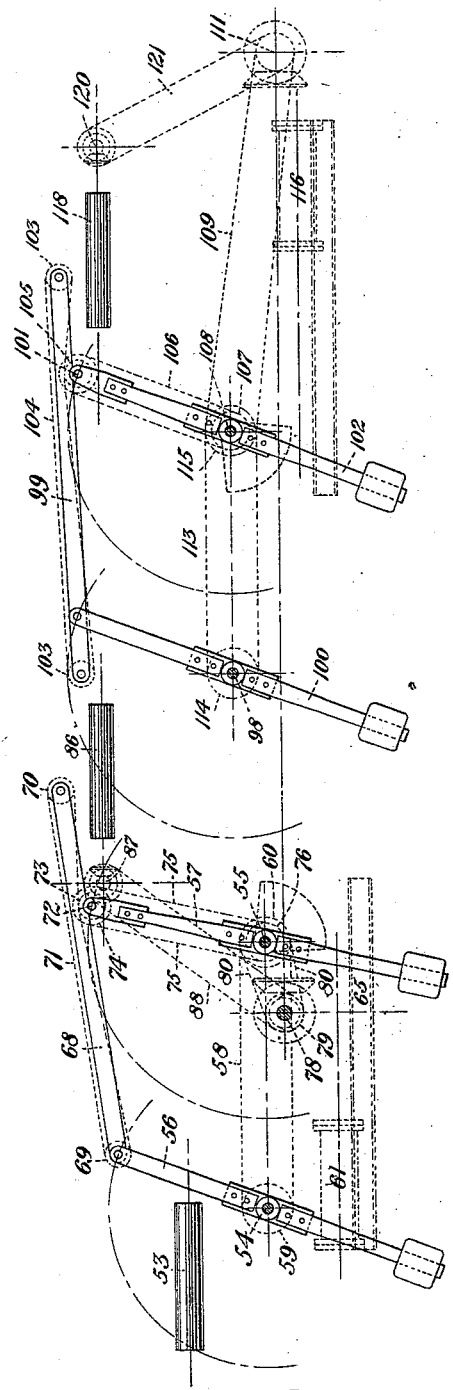
WITNESSES
INVENTOR
William H. Maddock
by W. Bakewell & Sons
his Attorneys.

(No Model.) 8 Sheets—Sheet 6.

W. H. MADDOCK.
PLATE ROLLING MILL.

No. 530,112. Patented Dec. 4, 1894.

WITNESSES

INVENTOR
William H. Maddock
by W. Bakewell & Sons
his Attorneys.

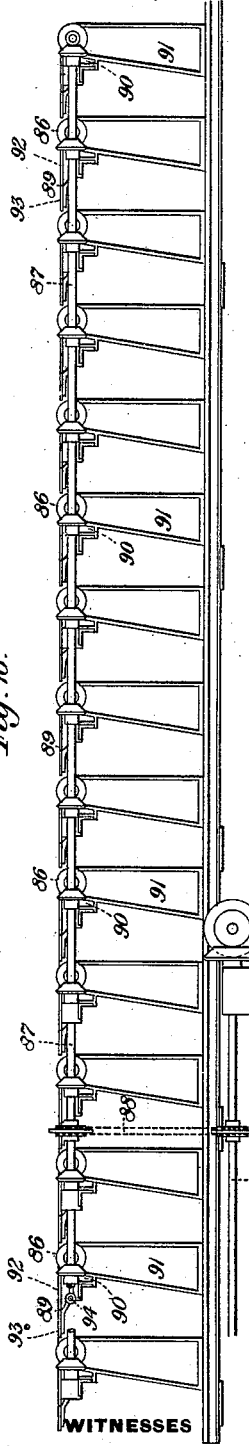

(No Model.) 8 Sheets—Sheet 8.
W. H. MADDOCK.
PLATE ROLLING MILL.
No. 530,112. Patented Dec. 4, 1894.
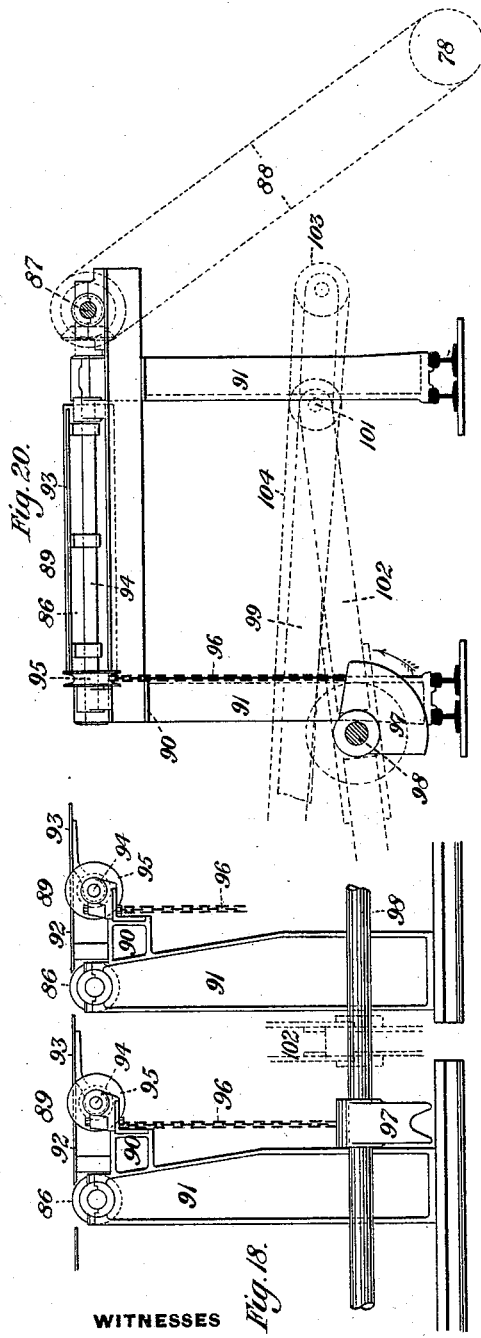
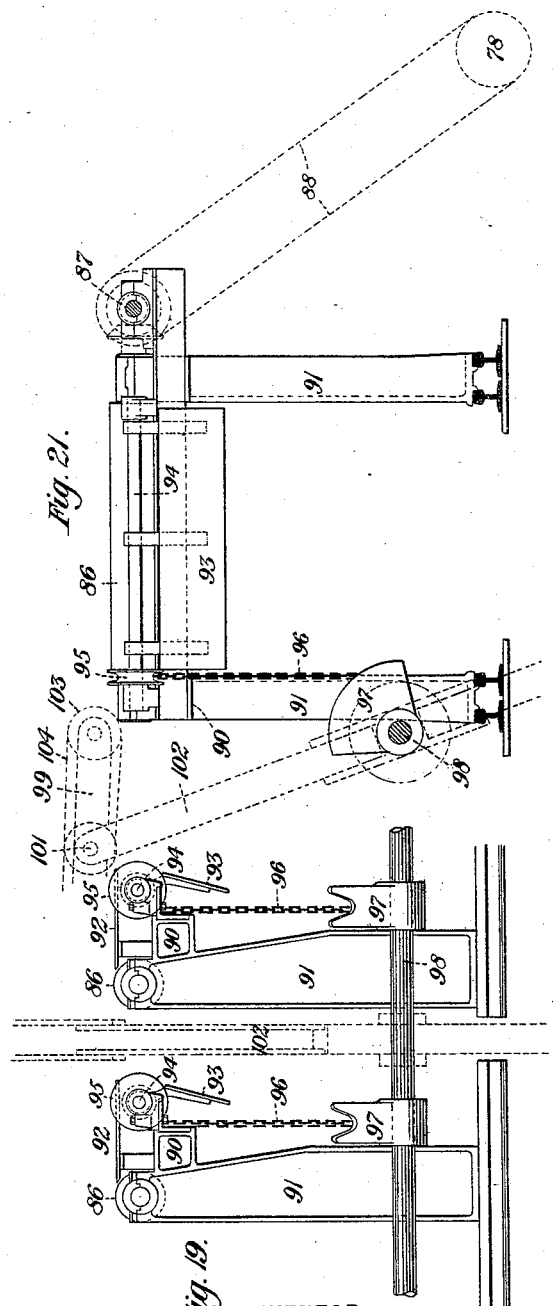
WITNESSES
INVENTOR
William H. Maddock
by W. Bakewell & Sons
his Attorneys

UNITED STATES PATENT OFFICE.

WILLIAM H. MADDOCK, OF PITTSBURG, PENNSYLVANIA, ASSIGNOR TO THE WHEELING STEEL AND IRON COMPANY, OF WHEELING, WEST VIRGINIA.

PLATE-ROLLING MILL.

SPECIFICATION forming part of Letters Patent No. 530,112, dated December 4, 1894.

Application filed August 3, 1892. Serial No. 442,014. (No model.)

*To all whom it may concern:*

Be it known that I, WILLIAM H. MADDOCK, of Pittsburg, in the county of Allegheny and State of Pennsylvania, have invented a new and useful Improvement in Plate-Mills, of which the following is a full, clear, and exact description, reference being had to the accompanying drawings, forming part of this specification, in which—

Figure 1:
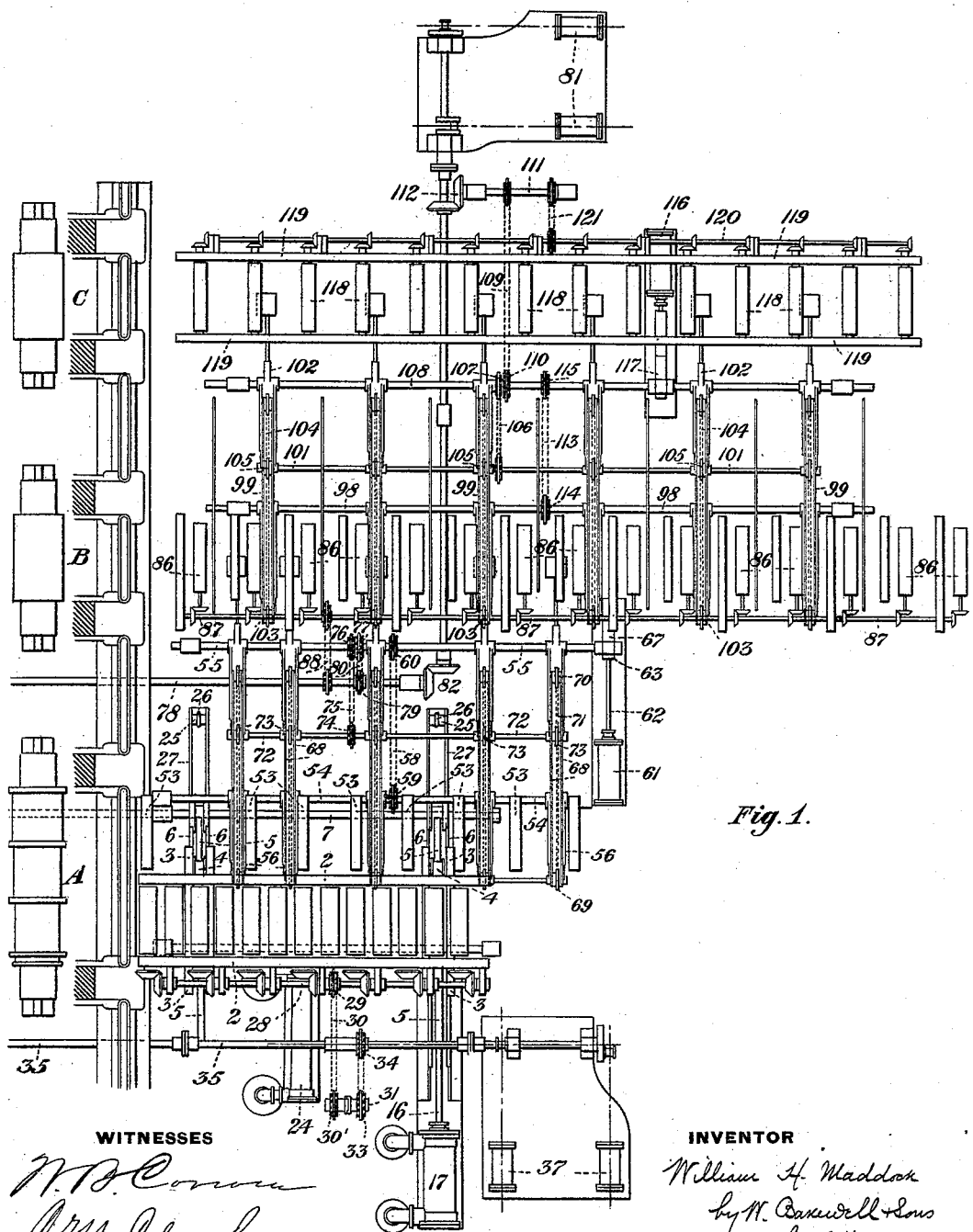
Figure 12:
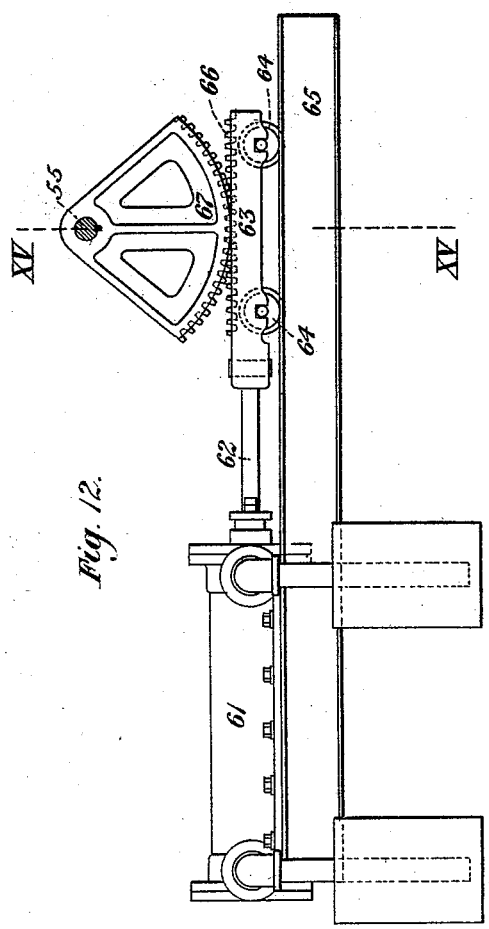
Figure 13:
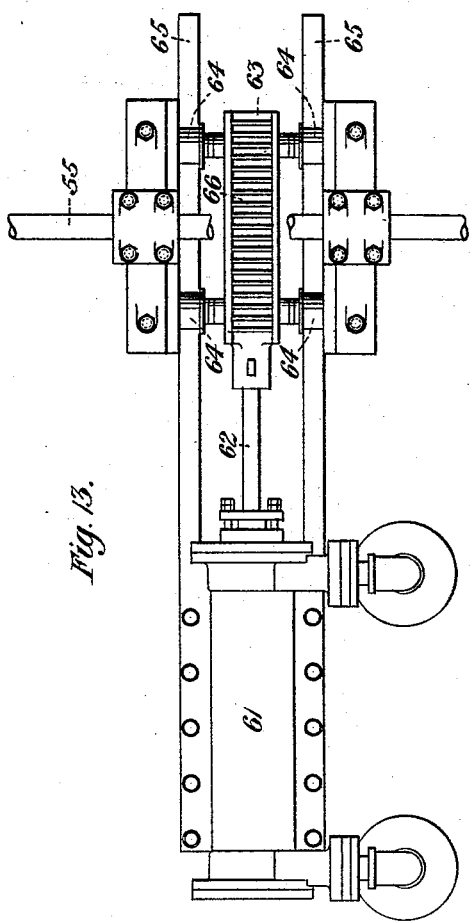
Figure 15:
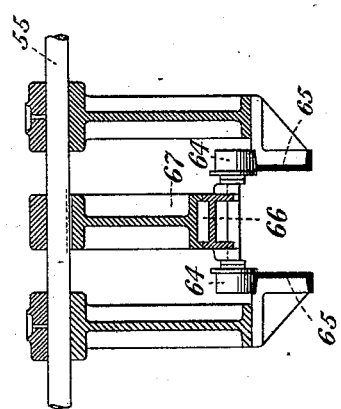
Figure 14:
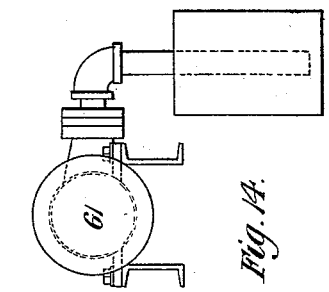

Figure 1 shows a plan view of the rolls and feed-tables upon one side of the same; and Fig. 2 is a similar view of the rolls and the tables on the opposite side, these two views together illustrating the entire plant. Fig. 3 is an enlarged plan view of the first set of feed-tables with parts broken away, from and to which the metal passes from the roughing-rolls. Fig. 4 is an end view of the same, showing the driving connections for the feed-rollers; and Figs. 5 and 6 are similar views, showing the actuating connections for raising and lowering the feed-table and reciprocating it horizontally, these two views showing the parts in different positions. Figs. 7, 8, and 9 are detail views of the oscillating table on the opposite side of the roughing-rolls. Figs. 10 and 11 are end elevations of the transferring tables which move the metal laterally from the roughing-rolls to the bull-heads. Figs. 12 and 13 are side elevational and top plan views respectively, of the cylinder and connections for actuating these transfer tables. Fig. 14 is an end view of the same; and Fig. 15 is a cross-section on the line XV—XV of Fig. 12. Fig. 16 is a side elevation; and Fig. 17 a top plan view of the feed and transfer tables employed with the bull-heads. Figs. 18 and 19 are enlarged side elevations of a portion of these tables, showing the parts in different positions; and Figs. 20 and 21 are corresponding end elevations, showing the parts in similar positions.

Like symbols of reference indicate like parts in each of the drawings.

I shall describe the construction and operation of the various feed and transfer tables in the serial order in which the metal reaches them in its passage through the mill, which mill consists essentially of three sets of rolls in line with each other, a three-high set of roughing-rolls A, a three-high set of bull-heads B, and a two-high set of finishing-rolls C, which are driven continuously in one direction in the ordinary manner.

The construction and operation of the roughing-roll feed-tables are as follows:

Referring to Figs. 1, 3, 4, 5, and 6 of the drawings, 2, 2, represent the side bars of a long truck, having the cross-bars 3, 3, near each end, in which bars are trunnioned the supporting-wheels 4, 4, which ride upon the rails 5, 5, carried upon the rocking-levers 6, 6. These levers 6, 6, are secured near their centers to the shafts 7, 7, to which are keyed the short levers 8, 8, connected by a link 9 and actuated through a link 10 at one end which is pivoted to one lever 8 and to a cross-head 11, having friction-wheels 12 and 13 traveling upon either side of a stationary guide 14 secured to the beams 15. This cross-head is carried at the outer end of a piston-rod 16 actuated by the motive cylinder 17, by means of which the levers 6, 6, are oscillated and the rails 5, 5, moved vertically in a curved path. About friction wheels 25 at the lower ends of the levers 6, 6, take the yokes 26, bearing at their lower ends the beams 27, upon which may be placed any suitable amount of counterweighting material which will serve to oppose the weight of the metal upon the truck and necessitate less power to swing the levers 6 and raise the truck. The truck carrying the feed-rollers rides upon the rails 5 and is prevented from moving sidewise, except when so desired, by the downwardly projecting slotted plates 18, at the center of the truck, through the slots 19 in which passes the shaft 20. This shaft bears at its outer ends the wheels or rollers 21, which roll between the guides 22 above and below the same, thus preventing their upward or downward movement. Between the wheels 21 a collar encircles the shaft, and to this collar is rigidly connected the piston-rod 23 of a motive cylinder 24, by means of which the feed-table truck may be moved laterally upon the rails 5 at any elevation.

To actuate the feed-rollers in all positions of the truck, I secure to the usual bevel gear shaft 28, trunnioned at one side of the truck, a sprocket-wheel 29 over which a sprocket-chain 30 passes from a similar wheel 30' upon a short loose shaft 31, having supporting links 32 provided with collars taking about the shafts 28 and 31. From a second sprocket wheel 33 upon the shaft 31, a sprocket chain passes about a similar wheel 34 upon a power-driven shaft 35, having links 36 connecting it with the shaft 31. The shaft 35 is lower than the shaft 31, and, as shown in Figs. 1 and 2, extends the entire length of the feed-tables on each side of the roughing rolls, it passing beneath the roll connection and being driven by the engine 37. Thus as the truck rises and falls and moves laterally upon the rails, the feed-rollers have a continuous power-connection, the links opening or closing with a shear or lazy-tongs action. Upon the other side of the roughing rolls I employ a tipping feed-table, shown in Figs. 2, 7, 8 and 9. The side beams 38 of this table are trunnioned at their rear ends in bearings 39, and motion is imparted to the feed-rollers thereon through the sprocket-chain 40 passing over the sprocket-wheels 41 and 42 upon the shafts 35 and 43, respectively. The shaft 43 is carried at one side of the side beams and is provided at 44 with a universal joint so that the rollers are rotated in any position of the table through the usual bevel-gears, as shown.

To oscillate the table I pivot beneath its forward portion a pair of counterweighted levers 45 upon a rock-shaft 46. From this shaft extend the short levers 47, to each of which is pivoted the vertical connecting link 48 pivoted to the front portion of the table. To the shaft 46 is keyed the lever 49, which is severed and joined by a ball-and-socket-connection 50 and pivoted to the lever 51 by a second ball and socket joint 52. The lever 51 is keyed upon one of the rock-shafts 7, which is suitably extended and passes beneath the rolls. The action is as follows:—The pile or slab to be rolled is delivered upon the truck, which is elevated by admitting fluid to the cylinder 17, and the feed-rollers are actuated to carry forward the metal which enters between the upper and middle rolls, and the tipping table which has been tilted upwardly by the rocking of the shaft 7 receives the same. The shafts 7 are then rocked back to their normal position and the tilting table thereby lowered. The engine is now reversed and the feed-rollers on the tilting-table carry the bar into the lower pass of the roughing-rolls between the middle and lower rolls, whence it passes on to the truck. The truck is then raised as before and the cylinder 24 is now actuated to move the truck laterally to the next pass between the upper and middle rolls. The tilting-table receives and returns the bar upon the lowered truck as before which is again raised and pushed laterally upon the rails 5 to the third pass, when the truck is retracted to its first position, and the metal passing back from the tilting table through the third lower pass, emerges upon the stationary rollers 53 pivotally supported in line therewith and rotated merely by the issuing metal.

*The transfer mechanism.*—From the rollers 53 the metal is carried to the bull-heads by the mechanism of Figs. 10 to 14 inclusive; Figs. 10 and 11 also showing at the right hand the mechanism for transferring the metal from the bull-heads to the finishing rolls. Between the roughing rolls and the bull-heads are supported the two parallel shafts 54 and 55, having secured thereto, near their centers, the counterweighted levers 56 and 57. The shafts are rotatably connected by the sprocket-chain 58 passing over the sprocket-wheels 59 and 60 thereon, and the oscillatory motion of the shafts is imparted by the motive cylinder 61, shown in Figs. 12 to 15 inclusive. The piston-rod 62 of this cylinder is keyed to a small reciprocating carriage 63 supported upon wheels 64 rolling upon the flanged beams 65 which support the motive cylinder. Upon this carriage is secured a rack 66, which meshes with a segmental pinion 67 keyed to the shaft 55, and as the piston rod is actuated, an oscillatory motion is accordingly imparted to the shafts 55 and 54. To the upper end of the levers 56 are pivoted the links 68 provided at their ends with the sprocket-wheels 69 and 70 connected by the chain 71. The links 68 rest upon shafts 72 in the upper ends of the levers 57, upon which shafts are keyed small sprocket-wheels 73, which engage with and drive the chains 71. Upon the same shaft is secured a sprocket-wheel 74 connected by a chain 75 with a similar wheel 76 upon the shaft 55. The wheel 76 is loose upon the shaft 55 but is fastened to a similar loose wheel 77, which is driven from the actuating shaft 78 by the sprocket-wheel 79 and chain 80. By this connection the shaft 72 is continuously rotated in any position of the lever as the power is taken from a wheel upon the pivotal support of such lever. The shaft 78 is driven from the engine 81 by the bevel-gear 82, and extends to the other side of the rolls, where it actuates the feed-rollers 83 upon a stationary table 84 through the sprocket-chain connection 85. The action of these feed-tables is as follows: The bar having emerged upon the friction rollers 53, the shaft 78 is rotated and the shafts 54 and 55 oscillated by the motor 61. The links 68 in their upward curved motion pass between rollers 53 and receive the bar upon the sprocket-chains 71 which, as the arms swing to their position over the set of feed-rollers 86 in front of the bull-heads, carry the bar thereover and drop it upon the rollers. The lever-arms are then swung back to their normal position, as shown in Fig. 10, and the bar is ready to enter the bull-heads. The rollers 86 are driven from shaft 87 provided with the usual bevel-gears and driven from the shaft 78 by the sprocket-wheel connection 88. The bar being fed forward by these rollers, enters the bull-heads between the upper and middle rolls and passes out upon the table 84. The engine then being reversed, the metal is guided between the middle and lower rolls, and as it emerges from the rolls is guided up an inclined plate or other suitable guide on to the feed-rollers 86. The metal by this time has been elongated to such an extent that it is easily bent and guided, and as the rollers 86 are a considerable distance apart would of its own weight bend down between the same, unless suitable supports were provided for its prevention. These supports are shown in Figs. 16 to 21 inclusive, and consist of tables 89 supported between the rollers upon projections 90 from the pillow-block stands 91. Each table consists of two parts, a stationary portion 92 fixed to the projection 90 and a swinging portion 93 hinged upon a shaft 94 pivoted upon the projection 90 and having a sprocket wheel 95 to which is secured a sprocket-chain 96, this chain passing at its lower end about and being secured to a segmental grooved pulley 97, keyed to a shaft 98. The portions 93 of the table are hinged in order to admit of the passage of the links 99, which remove the metal from the bull-head feed-table and transfer it laterally to the finishing-rolls. These links, as shown at the right hand of Figs. 10 and 11, are pivoted to the counterweighted levers 100 and rest upon the shafts 101 in the upper ends of levers 102. About the sprocket-wheels 103 in the ends of these links pass the chains 104, these chains being actuated by the wheels 105 upon the shafts 101, which are driven by the chain 106 passing over the wheel 107 upon the shaft 108 which carries the levers 102. The wheel 107 is loose upon the shaft 108 and is driven by the chain 109, which connects the loose wheel 110, which is secured to the wheel 107, to the power shaft 111 driven by the bevel-gear 112 from the engine 81. A chain 113 connects sprocket-wheels 114 and 115 keyed to the shafts 98 and 108, so that the shafts will rotate simultaneously when actuated by the motor 116 through the rack and segmental pinion connection 117, which is identical with the connections for the bull-head tables, as shown in Figs. 12 and 13.

The relation of the links 99 and the pivoted tables is clearly shown in Figs. 18 to 21 inclusive, and it is evident that as the shaft 98 is rotated and the levers raise the links, the chains 96 rotate the shafts 94 and cause the pivoted portions 93 to swing downwardly out of the path of the links which rise between the rollers 86 and carry the bar to the finishing-tables 118, upon which it is dropped by the chains 104 traveling upon the links. As the links swing back to their normal position, the shaft 98 rotates in the opposite direction, and the pivoted tables rise and are again ready to receive the next bar. The feed-rolls 118 are supported upon the stationary table 119 and driven from shaft 120, which receives motion through the sprocket connection 121 from the shaft 111. From this table the metal enters the single pass in the two-high finishing rolls C, and emerges upon the friction rollers 122, from which it is removed for use.

The advantages of my invention will be appreciated by those skilled in the art. The plant is compact, and automatic in the handling of the metal, and in actual practice is found to be efficient in the highest degree. The power for the feed-tables is entirely derived from the two sets of engines, and the amount of hand labor required is reduced to a minimum.

I do not claim herein the specific mechanism of the feed-tables and transfer tables, as these are made the subject of my Patents Nos. 504,393, 504,394, and 504,395, granted September 5, 1893.

Without restricting myself to the exact construction shown, what I claim is—

1. A three-high mill having a swinging feed-table, counterweighted levers mounted upon a rock-shaft beneath the table, levers projecting from said shaft, and carrying links connected to the feed-table, and a universal joint between said shaft and the actuating shaft; substantially as described.

2. A mill-plant comprising two three-high sets of rolls in line with each other, a laterally movable truck carrying feed-rollers on one side of the first set, means for moving the same vertically in parallel planes, an oscillating feed-table upon the other side, and transfer mechanism arranged to move between the feed-tables on one side of the sets; substantially as and for the purposes described.

3. A three-high set of rolls, having on one side a vertically and laterally movable truck carrying feed-rollers, and a set of stationary friction rollers on the same side in line with the last pass; substantially as and for the purposes described.

4. A set of rolls, having on one side a vertically and laterally movable truck carrying feed-rollers, a set of stationary friction-rollers on the same side in line with the last pass, and an oscillating feed-table upon the opposite side; substantially as and for the purposes described.

5. A set of rolls, having on one side a vertically and laterally movable truck carrying feed-rollers, a set of stationary friction-rollers on the same side in line with the last pass, and lateral transfer devices operating between the friction rollers and an oscillating feed-table upon the opposite side; substantially as and for the purposes described.

6. The combination with the two three-high sets of rolls and the two-high set in line with each other, of a vertically and laterally movable truck carrying the feed-rollers of the first set, suitable feed-rollers for the other sets, and transfer mechanism between the feed-tables upon one side; substantially as and for the purposes described.

7. The combination with the two three-high sets of rolls and the two-high set in line with each other, of a vertically and laterally movable truck carrying the feed-rollers of the first set, an oscillating feed-table on the opposite side of the first set, suitable feed-rollers for the other sets, and transfer mechanism between the feed-tables upon one side; substantially as and for the purposes described.

8. The combination with the two three-high sets of rolls and the two high set in line with each other, of a vertically and laterally movable truck carrying the feed-rollers of the first set, a set of friction rollers in front of the last pass of said set, transfer mechanism working between these friction-rollers, an oscillating feed-table on the opposite side of the first set, suitable feed-rollers for the other sets, and transfer mechanism between the feed-tables upon one side; substantially as and for the purposes described.

In testimony whereof I have hereunto set my hand this 14th day of July, A. D. 1892.

WILLIAM H. MADDOCK.

Witnesses:
W. B. CORWIN,
C. BYRNES.